Dec. 4, 1962 T. J. KELLY 3,066,334
VEGETABLE CLEANER
Filed July 13, 1961 2 Sheets-Sheet 1

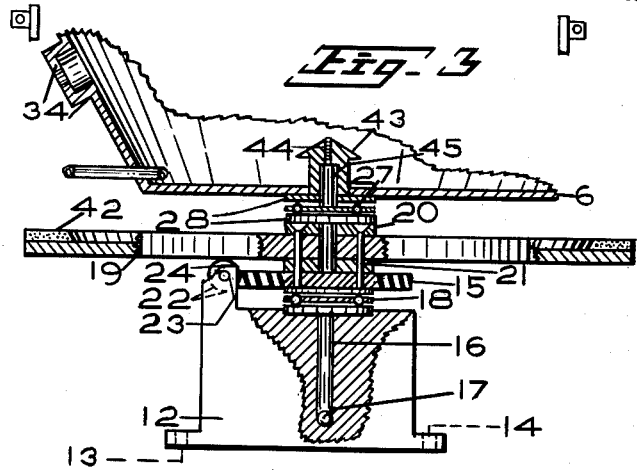
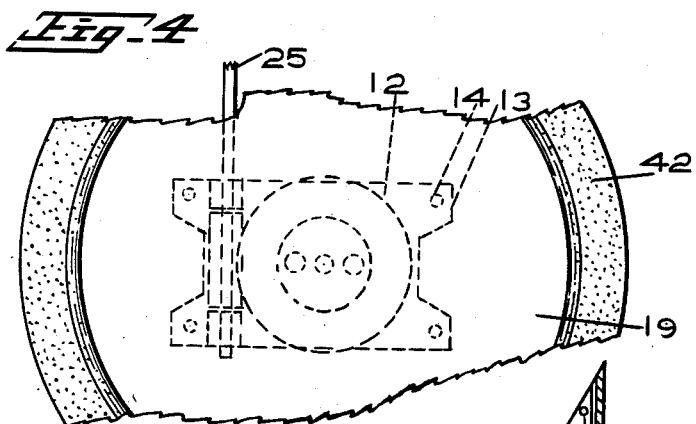
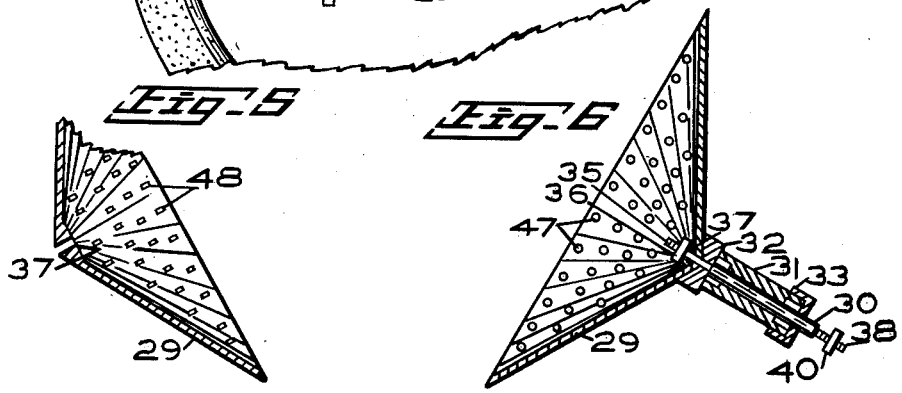

United States Patent Office 3,066,334
Patented Dec. 4, 1962

3,066,334
VEGETABLE CLEANER
Thomas James Kelly, International Falls, Minn.
(4412 Mead St., P.O. Box 317, Central Valley, Calif.)
Filed July 13, 1961, Ser. No. 123,856
4 Claims. (Cl. 15—3.12)

This invention relates to vegetable cleaners, having reference to a container with motor driven cleaning elements.

In the art to which the invention relates appliances for peeling potatoes are in use in which the potatoes may be cleaned and peeled by the use of brushes or like abrasive elements mounted to be motor driven.

The present invention is concerned with providing a vegetable cleaning appliance for potatoes or other vegetables in which the vegetables are sprayed with water and at the same time agitated by rotatable cleaning elements that are motor driven.

The primary object of the invention is accordingly to provide an appliance for family use in which vegetables may be cleaned by motor driven cleaning elements in a container in which water is continuously sprayed over the vegetables and in improvements in the cleaning elements and their use.

Other features and advantages of the invention will become apparent by reference to the accompanying description taken in conjunction with the drawings.

In the drawings, wherein is illustrated a preferred embodiment of the invention, FIG. 1 is a side view of the appliance, shown with the outer casing broken away and in section, and with the inner casing broken away and partly sectioned to disclose the working parts, the latter being shown with parts in vertical section.

FIG. 3 is an enlarged side view, in part broken away and in section, showing the base and drive plate for the vegetable cleaning elements, and including the mechanism connectable for rotating the plate and a fragment of the vegetable container.

FIG. 4 is an enlarged top plan view of the drive plate for the vegetable cleaning elements, including the driving shaft for the plate, shown with the plate and the shaft broken away, and with the base and driving connection for the plate indicated in dashed lines.

FIG. 5 is an enlarged side view in section of a slotted type of vegetable cleaning disc taken by itself, shown partly broken away.

FIG. 6 is an enlarged side view of a perforated disc and mounting for the disc, shown largely in section.

Figure 1:
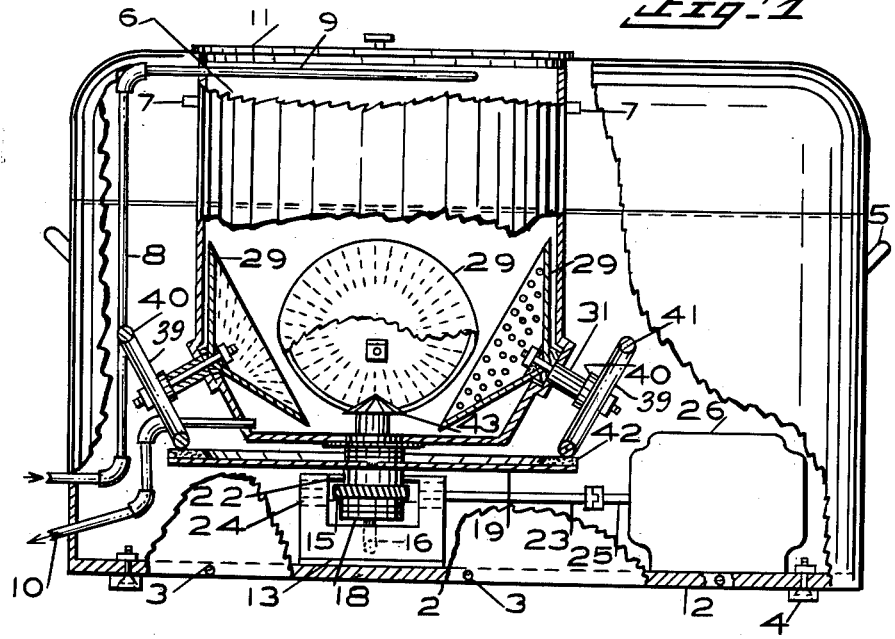
Figure 2:
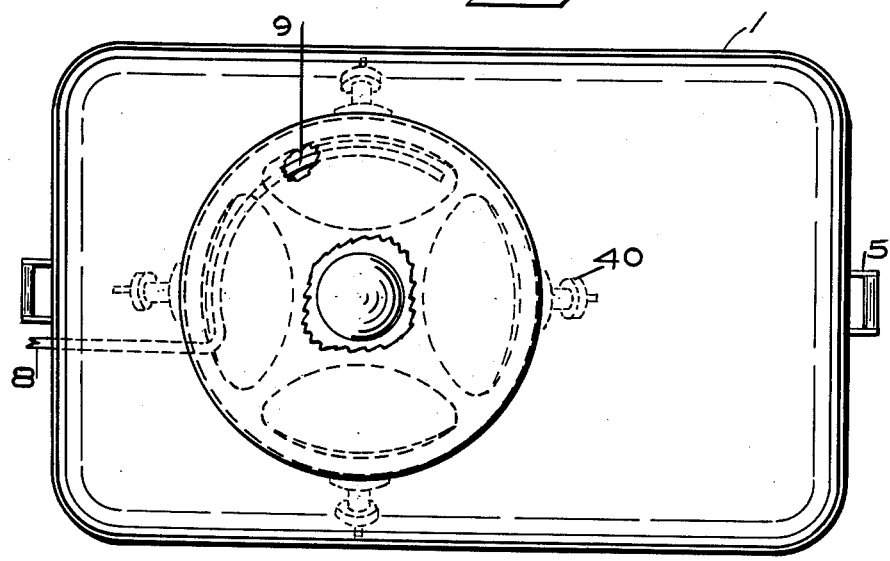
FIG. 2 is a top plan view of the casing, shown with the top broken away in part and the cleaning elements indicated in dashed lines.

Having reference to the drawings the cleaning mechanism for the vegetables is mounted in a casing 1 that includes a bottom plate 2 attached to the side wall of the casing by screws 3, the bottom plate having feet 4 and the casing having handles 5.

Within the casing is mounted a container 6 secured to the casing wall by lugs 7 bolted thereto or similarly secured. There is also a water inlet pipe 8 with a semicircular outlet portion 9 having perforations at intervals for spraying the water over vegetables to be cleaned, the water discharging from the container by an outlet pipe 10. The container would include a cover 11.

On the bottom of the casing is a base 12 having laterally projecting foot portions 13 with openings at 14 by which the base may be bolted to the casing. On the base 12 is mounted a gear wheel 15 on a vertical shaft 16 that is supported on an end thrust bearing 17 and including a ball bearing race at 18 between the gear wheel and base.

Above the gear wheel 15 on the shaft 16 is mounted a drive plate 19 on a hub 20 that is fixed to the gear wheel by screws 21. The gear wheel is driven by a worm gear 22 on a shaft 23 mounted for rotation in upstanding lugs 24 on the base 12. The shaft 23 is connected to a drive shaft 25 of a motor 26. There is also included a ball bearing race 27 (FIG. 3) between the drive plate 19 and the container 6 with interposed wear plate 28.

The container 6 carries a series of conical discs 29, preferably four as shown, mounted for rotation on shafts 30. These shafts are rotatable in bearing sleeves 31 that include upper and lower packing caps 32 and 33 at the ends, the upper caps setting in recesses 34 (FIG. 3) formed in the container wall. The shafts 30 are secured to the conical discs by threaded ends 35 (FIG. 6) attached by nuts 36, for which fillers 37 are provided within the discs. At the outer ends the shafts include threaded ends 38 on which are mounted wheels 39 (FIG. 1) secured by nuts 40. The wheels 39 have rubber or like tires 41 (FIG. 1) for travel on an annular rubber or like tread 42 on the drive plate 19 so as to be frictionally engaged and driven thereby.

Within the container 6 is a conical cap 43 inset in a suitable opening in the bottom of the container 6 and threaded on a stud 45 that is mounted in the wear plate 28 that is fixed, as by welding, to the bottom of the container and with the bearing race 27 attached to its lower end.

The conical discs 29 have openings therein, either perforations 47 (FIG. 6) or slots 48 (FIG. 5), these openings having roughened inner ends to aid in dislodging the adhering dirt and foreign matter from the vegetables.

In the use of the appliance water is sprayed in the container 6 over the vegetables to be cleaned and the drive plate 19 is rotated by the motor 26. This by its frictional engagement of the tires 41 on the wheels 39 with the annular treads 42 of the drive plate rotates the conical discs 29, agitating and turning the vegetables over which water is being continuously sprayed by the pipe 8 and end section 9, which latter includes perforations indicated at 49, the water with the dirt from the vegetables draining off through the outlet 10. The cleaning action is aided by having the inner ends of the perforations 47 and slots 48 roughened, such as by drilling the openings from the outside. The cap 43 may be unthreaded from the stud 45 for cleaning refuse from the bottom of the container where required, and the discs 29 can also be taken out by removing the nuts 36.

Having thus particularly set out the nature of my invention, what I claim and wish to secure by Letters Patent is:

1. In a vegetable cleaner an outer casing, a container within the casing for the vegetables to be cleaned, said container having a bottom and a side wall, a drive plate, means mounting the drive plate for rotation horizontally below the container and connectable to be motor driven, a series of conical discs, shafts on which the discs are mounted, means mounting the shafts in the container wall with the discs disposed within the container spaced at intervals facing inward and the shafts projecting outwardly of the container, and wheels on the outward portions of the shafts engaging to be frictionally driven by the drive plate.

2. A vegetable cleaner as set out in claim 1 and including a conical cap and means mounting the cap on the bottom of the container centrally thereof between the conical shaft driven discs.

3. A vegetable cleaner as set out in claim 1 in which the conical shaft driven discs have a plurality of openings therein.

4. A vegetable cleaner comprising an outer casing, a container mounted fixed within the casing, said container having a side wall and bottom and in which the vegetables are to be cleaned, water inlet and discharge pipes for the container, the inlet pipe including a perforated portion discharging downward within the container, a base in the container, a shaft mounted for rotation in the base vertically disposed, a horizontal drive plate on the shaft, means on the shaft and base for connecting the shaft to be motor driven, a series of conical discs, shafts mounted for rotation in the container wall and on which conical discs are carried disposed within the container with the open sides of the discs facing inward, and wheels on the disc shafts outward of the container disposed to be driven by the drive plate.

References Cited in the file of this patent

UNITED STATES PATENTS 2,326,356    Haslam _____ Aug. 10, 1943

FOREIGN PATENTS 533,237    Italy _____ Sept. 20, 1955